United States Patent
Gupta et al.

(10) Patent No.: US 12,492,320 B2
(45) Date of Patent: Dec. 9, 2025

(54) RELEASE COATING COMPRISING WATERBORNE LATEX POLYMER COMPRISING POLYMERIZED SURFACTANT

(71) Applicant: 3M INNOVATIVE PROPERTIES COMPANY, St. Paul, MN (US)

(72) Inventors: Rohit Gupta, St. Paul, MN (US); James P. DiZio, St. Paul, MN (US); Maria O. Miranda, Minneapolis, MN (US); Phillip H. Henna, Cottage Grove, MN (US); Christopher P. Gerlach, Woodbury, MN (US); Anna M. Clausen, Minneapolis, MN (US); Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 437 days.

(21) Appl. No.: 18/014,576

(22) PCT Filed: Jun. 21, 2021

(86) PCT No.: PCT/IB2021/055447
§ 371 (c)(1),
(2) Date: Jan. 5, 2023

(87) PCT Pub. No.: WO2022/018540
PCT Pub. Date: Jan. 27, 2022

(65) Prior Publication Data
US 2023/0257620 A1    Aug. 17, 2023

Related U.S. Application Data

(60) Provisional application No. 63/056,036, filed on Jul. 24, 2020.

(51) Int. Cl.
C09D 133/14    (2006.01)
C09J 7/24    (2018.01)
(Continued)

(52) U.S. Cl.
CPC ............ *C09D 133/14* (2013.01); *C09J 7/243* (2018.01); *C09J 7/387* (2018.01); *C09J 7/401* (2018.01);
(Continued)

(58) Field of Classification Search
CPC ...... C09D 133/14; C09D 131/04; C09J 7/243; C09J 7/387; C09J 7/401; C08F 218/08; C08F 220/343
See application file for complete search history.

(56) References Cited

U.S. PATENT DOCUMENTS 5,225,480 A    7/1993    Tseng et al.
5,516,865 A    5/1996    Urquiola
(Continued)

FOREIGN PATENT DOCUMENTS

EP    0 448 399 A2    9/1991

OTHER PUBLICATIONS

"Polymerizable Surfactants—Specifications", Hitenol AR Series, Montello, 2020, pp. 1-4.
(Continued)

*Primary Examiner* — Blaine Copenheaver
(74) *Attorney, Agent, or Firm* — Carolyn A. Fischer

(57) ABSTRACT

A release composition comprising a waterborne latex polymer particles comprising the polymerization reaction product of: i) a first monomer having an alkyl group with 12 to 24 carbon atoms, a nitrogen-containing or ester linking group, and a free-radically polymerizable (meth)acryl group; ii) a second free-radically polymerizable monomer having less than 12 carbon atoms; and iii) a free-radically
(Continued)

polymerizable surfactant; and an aqueous carrier liquid. Also described is a method of making a release coated article and articles.

18 Claims, 1 Drawing Sheet

(51) Int. Cl.
*C09J 7/38* (2018.01)
*C09J 7/40* (2018.01)
*B32B 37/26* (2006.01)

(52) U.S. Cl.
CPC ..... *B32B 2037/268* (2013.01); *B32B 2405/00* (2013.01)

(56) References Cited

U.S. PATENT DOCUMENTS

| | | |
|---|---|---|
| 6,028,155 A | 2/2000 | Collins et al. |
| 6,294,249 B1 | 9/2001 | Hamer et al. |
| 2005/0112368 A1* | 5/2005 | Hamer ............... C09J 7/243 428/343 |
| 2006/0141194 A1 | 6/2006 | Carlson et al. |
| 2016/0149067 A1* | 5/2016 | Hebrink ............. B01J 20/261 136/246 |
| 2017/0015873 A1 | 1/2017 | Goldstein |
| 2018/0265754 A1* | 9/2018 | Qie ...................... C08F 2/26 |
| 2025/0043143 A1* | 2/2025 | Liu ................... C09D 125/14 |

OTHER PUBLICATIONS

"Polymerizable Surfactants—Specifications", Hitenol BC Series, Montello, 2020, pp. 1-3.

"Polymerizable Surfactants—Specifications", Hitenol KH Series, Montello, 2020, pp. 1-3.

"The Effective Solutions for Various Industries", Plastic Additives, DKR Conversion Calculator [retrieved from the internet on Jul. 15, 2020], 2020, pp. 1-2.

Griffin, "Calculation of HLB Values of Non-Ionic Surfactants", Journal of the Society of Cosmetic Chemists, 1954, vol. 05, pp. 249-259.

International Search Report for PCT International Application No. PCT/IB2021/055447, mailed on Oct. 14, 2021, 5 pages.

* cited by examiner

RELEASE COATING COMPRISING WATERBORNE LATEX POLYMER COMPRISING POLYMERIZED SURFACTANT

SUMMARY

A release composition comprising a waterborne latex polymer particles comprising the polymerization reaction product of: i) a first monomer having an alkyl group with 12 to 24 carbon atoms, a nitrogen-containing or ester linking group, and a free-radically polymerizable (meth)acryl group; ii) a second free-radically polymerizable monomer having less than 12 carbon atoms; and iii) a free-radically polymerizable surfactant; and an aqueous carrier liquid. In typical embodiments, the first monomer has the formula

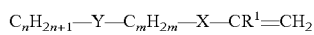

wherein n ranges from 12 to 24;
Y is a nitrogen-containing or ester linking group;
$R^1$ is hydrogen or methyl;
m ranges from 2 to 10; and
X is a divalent linking group selected from ester or amide.

In typical embodiments, the polymerizable surfactant comprises a (e.g. sulfur-containing or phosphorous-containing) anion. The polymerizable surfactant typically further comprises ethylene oxide repeat units. In favored embodiments, the release composition comprises less than 100 ppm of unpolymerized surfactant.

Also described is a method of making a release coated article and articles.

DETAILED DESCRIPTION

Figure 1:
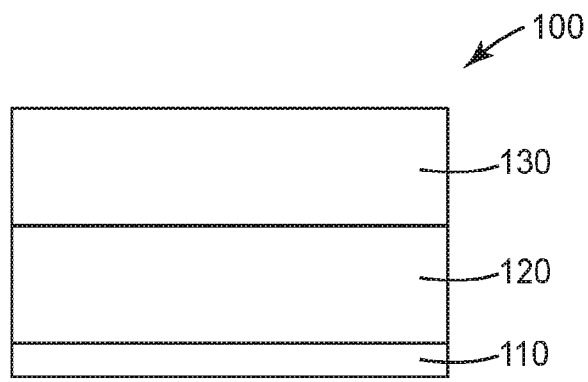
FIG. 1 is a side view of an article including a backing, a release coating on a major surface, and a pressure sensitive adhesive on the opposing major surface of the backing.

Presently described is a waterborne latex polymer composition. The composition is suitable for use as a low adhesion backsize (LAB) and release coating of a pressure-sensitive adhesive coated article.

The latex polymer comprises the reaction product of a first monomer having an alkyl group with 12 to 24 carbon atoms, a nitrogen-containing or ester linking group, and a free-radically polymerizable group. Such first free-radically polymerizable monomer may be characterized as a "long-chain" monomer.

The long-chain monomer typically has the following general formula:

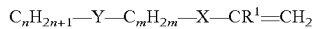

wherein n ranges from 12 to 24;
Y is a divalent polar linking group;
$R^1$ is hydrogen or methyl;
m ranges from 2 to 10; and
X is a divalent linking group selected from ester or amide.

In typical embodiments, Y is an ester group or a nitrogen-containing group such as urethane or amide. Representative Y groups include for example

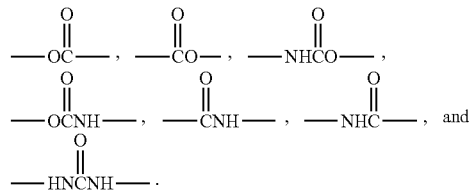

In typical embodiments, the alkyl group, $C_nH_{2n+1}$—, is of sufficient chain length such that the monomer or polymerized monomer crystallizes at room temperature. In typical embodiments, n is at least 12, 13, 14, 15, 16, 17, or 18.

In some embodiments, m is at least 2 and typically no greater than 3 or 4.

In some favored embodiments, Y is a nitrogen-containing group. In some favored embodiments, Y is a urethane group. One representative long chain monomer is octadecyl carbamoyl ethyl acrylate (ODCEA) depicted as follows:

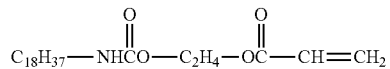

Other long chain monomers include for example octadecanoyl ethyl acrylate (ODEA) and hexadecyl carbamoyl ethyl acrylate (HDCEA) depicted as follows:

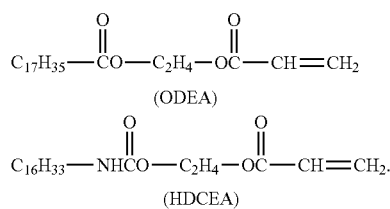

Yet other examples of long chain monomers are described in U.S. Pat. No. 5,225,480; incorporated herein by reference.

In some embodiments, a combination of at least two long-chain monomers of different types (e.g. different Y and/or different X groups) or of the same type but different alkyl chain lengths may be utilized.

The long-chain monomers are polymerized with one or more suitable second free-radically polymerizable monomers. The second monomer does not contain an alkyl group having at least 12 carbon atoms. In typical embodiments, the second monomer typically comprises an alkyl group containing less than about 12 carbon atoms. Examples of second free-radically polymerizable monomers include but are not limited to the following: vinyl halides such as vinylidene chloride, etc.; vinyl ethers such as vinyl propyl ether, vinyl butyl ether, etc.; vinyl esters such as vinyl acetate, vinyl propionate, vinyl butyrate, vinyl benzoate, etc.; acrylic esters such as methyl acrylate, ethyl acrylate, isobornyl acrylate, tetrahydrofurfuryl acrylate, hydroxyethyl acrylate, glycidyl acrylate, etc.; methacrylic esters such as ethyl methacrylate, butyl methacrylate, hexyl methacrylate, tetrahydrofurfuryl methacrylate, hydroxyethyl methacrylate, glycidyl methacrylate, etc.; acids such as acrylic acid, methacrylic acid, etc.; amides such as acrylamide, methacrylamide, etc.; aromatic vinyl compounds such as styrene, vinyl toluene, etc.; heterocylic vinyl monomers such as vinyl pyrrolidone, vinyl pyridine, etc.; vinyl nitriles such as acrylonitrile, methacrylonitrile, etc.; allyl compounds such as allyl glycidyl ether, etc.; esters and half-esters of diacids such as diethyl maleate, monomethyl itaconate, monobutyl itaconate, etc.; and mixtures thereof.

The second monomer is more typically comprises an alkyl or alkylene group having 2 to 4 carbon atoms such as vinyl acetate, vinyl propionate, methyl acrylate, butyl methacrylate, hydroxyethyl acrylate, methacrylic acid, glycidyl methacrylate, and mixtures thereof. Preferably, the second monomer is vinyl acetate, vinyl propionate, and mixtures thereof.

The weight ratio of the long-chain monomer to the second monomer can range from about 10:90 to about 90:10 depending upon the type of PSA to be used in conjunction with the water-borne LAB or release coating and the tightness of the release desired. In some embodiments, the weight ratio of the long-chain hydrocarbon monomer to the second monomer is at least 15:85, 20:80, 25:75, 30:70, 35:65 or 40:60. In some embodiments, the weight ratio of the long-chain hydrocarbon monomer to the second monomer is no greater than 85:15, 80:20, 75:25, 70:30, 65:35 or 60:40.

The long-chain monomers are polymerized with one or more suitable second free-radically polymerizable monomers and a polymerizable surfactant. Polymerizable surfactants are also described as polymerizable emulsifiers.

Surfactants useful in conventional emulsion polymerizations may be categorized as anionic, nonionic, amphoteric, and cationic.

The Hydrophilic-Lypophilic Balance (HLB) of a surfactant is an expression of the balance of the size and strength of the hydrophilic groups and the lypophilic groups of the surfactant. HLB refers to the value obtained by the Griffin's method (See Griffin WC: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, PA).

According to Griffin's method:

$HLB = 20*Mh/M$ where Mh is the molecular mass of the hydrophilic portion of the molecule, and M is the molecular mass of the whole molecule. This computation provides a numerical result on a scale of 0 to 20, wherein "0" is highly lipophilic. Typically, emulsifiers/surfactants having an HLB value greater than 8 are suitable for preparing the emulsion described herein.

Useful anionic surfactants include but are not limited to sulfosuccinates and derivatives, alkylaryl sulfonates, olefin sulfonates, phosphate esters, sulfates and sulfonates of ethoxylated alkylphenols, sulfates and sulfonates of ethoxylated fatty alcohols, sulfates of fatty esters, and mixtures thereof.

Useful nonionic surfactants include but are not limited to ethoxylated fatty alcohols, ethoxylated fatty esters, ethoxylated fatty acids, ethoxylated alkylphenols, ethylene oxide-propylene oxide block copolymers, and mixtures thereof.

Useful cationic surfactants include but are not limited to long chain amines and their salts, quaternary ammonium salts, and mixtures thereof.

Useful amphoteric surfactant include but are not limited to betaine derivatives, sulfobetaine derivatives, and mixtures thereof.

The surfactants used herein further comprise a free radically polymerizable group, such as a vinyl or (meth)acrylate group. Thus, the surfactant is copolymerized into the polymer chain of the latex polymer. The polymerizable surfactant may be aromatic or aliphatic. The polymerizable surfactant is typically an anionic surfactant, comprising a sulfur-containing or phosphorous-containing anion. The polymerizable surfactant typically further comprises an ethylene oxide (e.g. E-O) repeat unit. One representative class of such surfactants are sulfates and sulfonates of ethoxylated alkylphenols and alkylphenyls. Some representative structures are as follows wherein m and n is the number of repeat units:

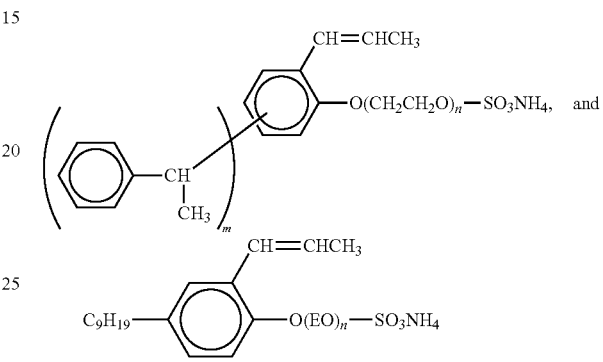

Another representative class of such surfactants are sulfates and sulfonates of ethoxylated alkyl ethers. One representative structure is as follows:

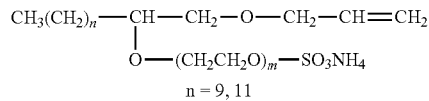

n = 9, 11

Each of these structures can have other anionic groups, such as phosphates. Each of the structures can have various numbers of ethylene oxide repeat units (i.e. n of the first two structures and m of the third structure). Typically the number of ethylene oxide units is at least 5 or 10 and no greater than 50, 45, 40, 35 or 30. In some embodiments, the number of ethylene oxide units is less than 25, 20, or 15. In some embodiments, the number of hydrophobic units (e.g. m of the first structure and n of the third structure) is a value such that the HLB is typically at least 8, 9, 10, 11, or 12, 13, 14, 15.

Polymerizable surfactants are commercially available from DKS, Japan as the trade designations HITENOL AR 1025, HITENOL AR 2025, HITENOL AR 3025, HITENOL BC-1025, and HITENOL KH-1025. Anionic copolymerizable surfactant are also available from Croda Inc., Newark, NJ under the trade designation Maxemul™ 6106-LQ-(MH) Maxemul™ 6112-SO(MH).

The amount of polymerizable surfactant is typically at least 1, 2, 3, 4, or 5 wt. % solids based on the total weight solids of the dried waterborne latex emulsion. In some embodiments, the amount of polymerizable surfactant is no greater than 15, 14, 13, 12, 11, 10, 9, 8, or 7 wt. % solids based on the total weight solids of the dried waterborne latex emulsion.

Mixtures of polymerizable surfactants may be utilized. In typical embodiments, little or no conventional non-polymerizable surfactants are utilized in the composition described herein. In typical embodiments, the final waterborne polymeric emulsions contain little or no "free" surfactant, i.e. surfactant that is not covalently bonded to the polymer chain of the latex polymer. The amount of surfactant that is not covalently bonded to the polymer chain of the latex polymer is typically less than 500, 400, 300, 200 or 100 ppm (0.1 wt. % solids of the dried latex).

As known by one of skill in the art, an initiator is typically utilized in emulsion polymerizations. Preferably, the initiator utilized is a water-soluble initiator such as dissociative initiators and redox initiators. Dissociative initiators are those which function by simple dissociation of a molecule or an ion into two radical species from which species initiation can then take place. Redox initiators are initiator systems which comprise two or more substances whose mutual interactions produce free radicals which are capable of initiating polymerization.

Dissociative initiators are typically inorganic salts of persulfuric acid such as potassium persulfate, sodium persulfate, and ammonium persulfate. Other useful dissociative initiators include but are not limited to aromatic diazoamino compounds, aromatic diazothio ethers, alkali-metal aryl diazoates, water-soluble analogues of azobisisobutyronitrile such as 4,4'-azobis-(4-cyanopentanoic acid) and its alkali-metal salts, 2,2'-azobis-(2-cyanopropane-1-sulfonate), 2,2'-azobis-(2-amidinopropane)dihydrochloride, .alpha.,.alpha.'-azobis-butyramidinium chloride, and azobis-(N,N'-dimethylene isobutyramidine) and its salts with strong acids.

Useful redox initiator systems include but are not limited to persulfate-mercaptan systems, persulfate-sulfite systems, chlorate-bisulfite systems, hydrogen peroxide-iron systems, hydroperoxide-iron systems, dibenzoyl peroxide-iron pyrophosphate systems, and hydroperoxide-polyamine systems.

The latex polymer emulsion is prepared by methods known in the art, such as described in previously cited U.S. Pat. No. 5,225,480. The long-chain monomer can be charged into a suitable vessel and melted at a temperature higher than its melting point. The second monomer can be gradually added to the vessel containing the melted long-chain monomer in order to form a mixture during which time the mixture is kept in a molten state. Preferably, the long-chain monomer is charged, in a solid state, along with the second monomer, in a solid or liquid state, into a suitable vessel prior to melting. A vessel equipped with a reflux condenser may be used when the second monomer possesses a relatively low boiling point. The melting and mixing of the monomers can also be carried out in a vessel held under pressure. The remainder of the emulsion polymerization components including the aqueous phase (preferably deionized water optionally in combination with cosolvents such as hexadecane, hexadecanol, pentanol, cetostearyl alcohol, and myristyl alcohol), the polymerizable surfactant, and an optional pH buffer are typically mixed in a separate vessel in order to form an aqueous solution and then heated to a temperature equal to or higher than the temperature of the monomer mixture. The monomer mixture is then typically added to the aqueous solution following which the resultant mixture is homogenized.

Alternatively, the long-chain monomer can be charged in a solid state and the optional second monomer can be charged in a solid state or a liquid state, in any order, into a vessel already containing the aqueous solution, following which the vessel is heated in order to melt the monomer. The resultant mixture is then homogenized. According to either approach, gentle agitation may be applied during the heating process in order to facilitate the melting process.

Homogenization can be accomplished using a conventional homogenizer as known in the art such as available from Microfluidizer Inc. The emulsion thus obtained is a stable emulsion containing droplets of monomer or monomer mixture having a diameter on the order of about 0.1 to about 0.5 micrometer dispersed within the aqueous phase.

The emulsion is typically charged into a suitable reactor followed by the initiator. To avoid inhibition by oxygen, the reactor is typically purged with an inert gas such as nitrogen before and after the emulsion is charged into the reactor. A conventional polymerization reactor equipped with an agitator and a condenser can be used in order to carry out the emulsion polymerization. In the laboratory, resin flasks and bottles heated in a water bath with proper agitation can also be used for this purpose.

Polymerization is then initiated by subjecting the emulsion to a means of initiation, typically by the application of heat. A suitable polymerization temperature typically falls within the range of about 50° C. to about 90° C. depending upon the type of initiator system and monomer composition utilized. It is desirable to maintain the polymerization temperature above the melting point or points of the long-chain monomer utilized so that a more homogeneous polymer composition is obtained. Polymerization times on the order of about 2 to about 20 hours is generally adequate, depending upon the initiator, monomer composition, and polymerization temperature utilized. The latex thus obtained comprises polymer particles having diameters on the order of about 0.1 to about 0.5 micrometer, stabilized by the emulsifier within the aqueous phase. The latex polymer thus obtained typically possesses a melting point or melting points above about 30° C., with at least one melting point in the range of about 50° C. to about 100° C. due to the presence of the long chain alkyl group.

The latex release coating may optionally comprise various additives as known in the art such as pH modifiers, coalescing agents, rheology modifiers, and defoamers, may be added. Depending upon the monomer composition, the type of emulsifier, and the type of initiator selected, it may be desirable to maintain the pH of the emulsion polymerization system within a certain range. For example, when a persulfate initiator and an anionic emulsifier are used, a pH greater than about 5 is desired for better colloidal stability. Examples of useful pH buffers include sodium bicarbonate, sodium hydrogen phosphate, ammonium hydroxide, sodium hydroxide and the like. Coalescing agents may be admixed with the latex in order to ensure adequate coverage of a coating thereof onto a substrate. Useful coalescing agents include but are not limited to NMP, toluene, xylene, ethyl acetate, methyl ethyl ketone, alcohols (e.g. isopropyl alcohol), and mixtures thereof. Useful rheology modifiers include but are not limited to, hydroxyethyl cellulose, poly (ethylene glycol), and mixtures thereof. When present the total amount of such additive(s) is typically no greater than 15, 14, 13, 12, 11, 10, 9, 8, 7, 6, 5, 4, 3, 2, 1 wt. %, based on the total dried release coating. In typical embodiments, the release coating can be silicone free.

The desired concentration of latex polymer in the aqueous carrier liquid of the emulsion depends upon the method of coating and upon the desired coating thickness. The aqueous carrier liquid comprises at least 75, 80, 85 or 90 wt. % water optionally in combination with organic solvents (e.g. coalescing agent), as previously described. In some embodiments, a polymer latex of a higher percentage solids content obtained from the emulsion polymerization process can be diluted with water to a lower concentration. In some embodiments, the weight percent solids of latex polymer is at least 2, 3, 4, 5, 6, 7, 8, 9 or 10 wt. % solids. In some embodiments, the weight present solids of latex polymer is no greater than 35, 30, 25, or 20 weight percent solids. By varying the percent solids of the coating solution from 5% and 30%, and the wet coating thickness from 5 μm to 30 μm, a range of coat weights may be prepared if desired. The thickness of the coating can be reduced further by stretching the coated substrate. In some embodiments, the thickness of the dried release coating is typically at least 25, 30, 35, 40, or 50 nm. The thickness of the dried release coating is typically less than 100, 75, 50 or 25 microns.

The latex coating composition may be applied to a suitable substrate by means of conventional coating techniques such as wire-wound rod, direct gravure, offset gravure, reverse roll, air-knife, and trailing blade coating. The coating is typically dried at a temperature of at least about 5° C. above the highest melting point of the latex polymer in order to obtain a coating possessing good release properties.

In some embodiments, the release coating can be applied during the manufacture of the film substrate.

Thermoplastic (e.g. polyester) film can be manufactured by an extrusion process. The (e.g. polyester) resin is first heated to a molten state and then extruded through a wide slot die in the form of an amorphous sheet. The sheet-like extrudate is rapidly cooled to form a cast sheet of polyester by extruding the amorphous sheet around a polished, revolving chilled casting drum. The cast polyester sheet can then be stretched in at least one direction, while being heated to a temperature of at least 80° C., 90° C., 100° C. ranging up to or 160° C. Other thermoplastic materials are extruded at different temperature ranges, as known in the art. For example polypropylene film can be stretched at about 150° C. The degree of stretching may range from about three to five times the original cast sheet unit dimension, preferably about three to four times the original cast sheet dimension. In some embodiments, the polyester film is biaxially oriented rather than uniaxially oriented.

Prior to coating the film surface with the aqueous coating composition of the present invention, the film may be surface treated in a conventional manner by exposure of the surface to a corona discharge. Alternatively, a primer may be applied to the film surface, as known in the art.

In some embodiments, the coating can be applied and dried before stretching. In other embodiments, the heat applied to the film during the subsequent preheating, stretching and/or heat-setting stages is generally sufficient to evaporate the water and cure and bind the coating to the polyester film. The oriented (e.g. polyester) film is generally heat-set at a temperature of at least 190° C., 200° C., or 210° C. and typically no greater than 235° C. or 240° C.

Suitable substrates include paper, metal sheets and foils, nonwoven fabrics, and films of thermoplastic resins such as polyesters such as polyethylene terephthalate (PET), polylactic acid (PLA) and polyethylene naphthalate (PEN), polyamides, polyolefins such as polyethylene and polypropylene (e.g. biaxial oriented polypropylene BOPP), polycarbonates, polyvinyl chloride, etc., although any surface requiring release toward adhesives can be used. In some embodiments, the thickness of the substrate is at least 0.5, 1 or 2 mils and typically no greater than 5, 10 or 15 mils.

One or both major surfaces of the substrate (e.g. backing) may further comprise a primer layer or be surface treated (e.g corona treated), as known in the art to promote adhesion of the release coating, adhesive or both.

The resulting PSA articles may be a tape, label, or wound dressings. The adhesive articles may be in the form of a sheet, multilayer sheet, or stack of sheets (e.g. note pad, easel pad, label pad, tape stack), or in the form of a roll, such as a roll of tape.

One illustrative PSA article 100 is shown in FIG. 1. This embodied (e.g. tape) article comprise release coating 110 disposed on a major surface of substrate (e.g. backing) 120 and a pressure sensitive adhesive 130 disposed on the opposing major surface of 120.

Figure 2:
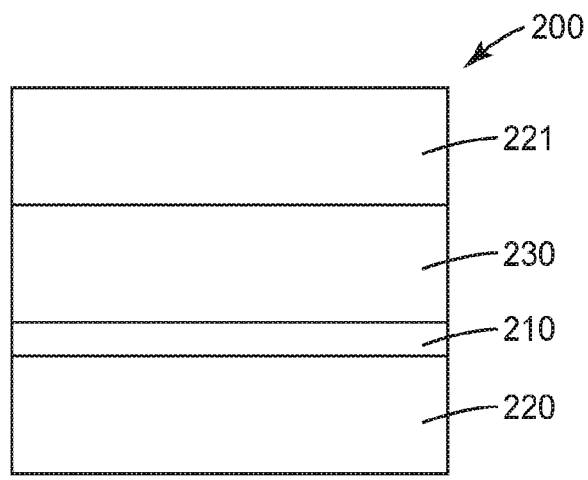
FIG. 2 is a side view of another article comprising a release coated backing and a separate pressure sensitive adhesive coated substrate.

FIG. 2 depicts another PSA article 200. This embodied article comprising a release coating 210 disposed on a major surface of substrate (e.g. backing) 220. A pressure sensitive adhesive 230 is releasably bonded to the release coating 210. The pressure sensitive adhesive is disposed on a major surface of a second substrate 221.

Figure 3:
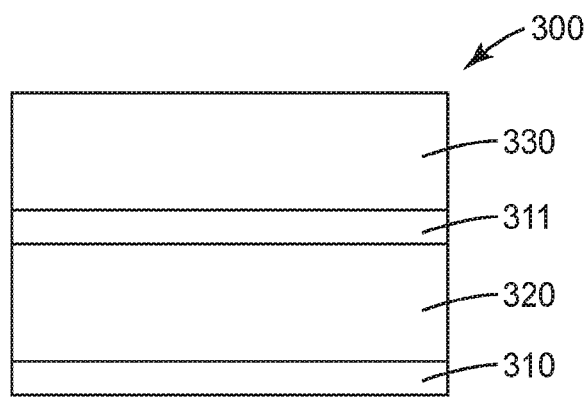
FIG. 3 is a side view of another article comprising a backing with release coating on both major surfaces and a pressure sensitive adhesive between the release-coated surfaces.

FIG. 3 depicts another PSA article 300. This embodied (e.g. tape) article comprises release coatings 310 and 311 disposed on both major surfaces of substrate (e.g. backing) 320 and a pressure sensitive adhesive 330 releasably bonded to release coating 311. One or both of release coatings 310 and 311 are a release coating as described herein.

The release coating described herein is suitable for use with a wide variety of pressure sensitive adhesive compositions. Suitable (e.g. pressure sensitive) adhesives include natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3\times10^6$ dynes/cm at a frequency of 1 Hz.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive.

The pressure sensitive adhesive may further include one or more suitable additives. Suitable additives are exemplified by crosslinking agents (e.g. multifunctional (meth) acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

It is appreciated that different release compositions are preferred for different pressure sensitive adhesive compositions. It is also appreciated that different types of adhesive articles have different preferred release properties.

The release and readhesion properties can be determined according to the test methods in the examples.

The average release force of the release coating can generally range from 1 ounce/inch to 50 ounces/inch at a peel rate of 90 inches (228.6 cm)/min. In some embodiments, the average release is no greater than 45, 40, 35, 30, 25, 20, 15, 10 or 5 ounces/inch at a peel rate of 90 inches (228.6 cm)/min.

In some embodiments, the average release force is at least 2, 3, 4, 5, 6, or 7 (22.3, 33.5, 44.6, 55.8, 78.1 g/cm) ounces/inch at a peel rate of 90 inches (228.6 cm)/min. A higher average initial release force at slower peel rates can be preferred in some embodiments to prevent a roll of tape from self-unwinding or to provide greater holding power when over taping occurs such as for packaging tape.

The readhesion of the release coating is typically no greater than 50, 45, 40, 35, 30, 25, 20, or 15 ounces/inch at a peel rate of 90 inches (228.6 cm)/min.

In some embodiments, the difference in release force and or readhesion between 7 days at 23° C. and 50% humidity or at 50° C. is no greater than 25, 20, 15, or 10% of the average CTH value.

In some embodiments, the release composition described herein provided lower initial release values than the same composition comprise octadecyl acrylate (lacking an ester or nitrogen-containing linking group). In some embodiments, the release composition described herein provides higher readhesion than the same composition comprise octadecyl acrylate. Further, the free-radically polymerizable surfactant can provide lower release and readhesion values than non-polymerizable surfactants.

EXAMPLES

Unless otherwise noted or readily apparent from the context, all parts, percentages, ratios, etc. in the Examples and the rest of the specification are by weight.

TABLE 1

Materials Used in the Examples

| Abbreviation | Description and Source |
| --- | --- |
| ODA | Octadecyl acrylate, obtained under tradename MIRAMER M180 from MIWON Specialty Chemical Co. LTD. Yongin-si, Korea |
| ODI | Octadecyl isocyanate, obtained under tradename MILLIONATE O (P) Hodogaya Chemical, White Plains, New York. |
| 2HEA | 2-hydroxy ethyl acrylate, obtained from Kowa American Corporation New York, New York |
| ODCEA | Octadecyl ethyl carbamate acrylate, synthesized as described below |
| VAc | Vinyl acetate, obtained from Celenese Pte Ltd, Irving, Texas |
| DBTDL | Dibutyltin dilaurate, obtained from Sigma Aldrich Chemical Corp., St. Louis, Missouri |
| MA | Methyl acrylate, obtained from The Dow Chemical Co., Midland, Michigan |
| AN | Acrylonitrile, obtained from Ineos USA LLC, League City, Texas |
| | Free-radically polymerizable surfactants |
| AR-1025 | HITENOL AR-1025 emulsifier, obtained from Dai-ichi Kogyo Seiyaku, Kyoto, Japan |
| AR-2025 | HITENOL AR-2025 emulsifier, obtained from Dai-ichi Kogyo Seiyaku, Kyoto, Japan |
| AR-3025 | HITENOL AR-3025 emulsifier, obtained from Dai-ichi Kogyo Seiyaku, Kyoto, Japan |
| MH-6106 | MAXEMUL 6106-LQ-(MH) emulsifier, obtained from Croda International Plc, East Yorkshire, United Kingdom |
| MH-6112 | MAXEMUL 6112-SO-(MH) emulsifier, obtained from Croda International Plc, East Yorkshire, United Kingdom |
| BC-1025 | HITENOL BC-1025 emulsifier, obtained from Dai-ichi Kogyo Seiyaku, Kyoto, Japan |
| KH-1025 | HITENOL KH-1025 emulsifier, obtained from Dai-ichi Kogyo Seiyaku, Kyoto, Japan |
| FES 32 | Non-polymerizable Surfactant - DISPONIL FES 32 (fatty alcohol polyglycol ether sulphate, Na-salt) emulsifier, can be obtained from BASF, Ludwigshafen, Germany |
| DS-10 | Non-polymerizable Surfactant - RHODACAL DS-10 (sodium dodecylbenzene sulfonate) emulsifier, obtained from Solvay S.A., Brussels, Belgium |

TABLE 1-continued

Materials Used in the Examples

| Abbreviation | Description and Source |
| --- | --- |
| DYNOL 607 | Ethoxylated-2,5,8,11-tetramethyl-6-dodecyn-5,8-diol, obtained under the tradename "DYNOL 607" from Air Products, Allentown, Pennsylvania |
| NaHCO$_3$ | Sodium bicarbonate, obtained from Church & Dwight Co., Inc, Ewing, New Jersey |
| NH$_2$S$_2$O8 | Ammonium persulfate, obtained from Univar, Downers Grove, Illinois |
| P1A | Copolymer latex of ODCEA (25 wt %) and VAc (75 wt %) made using AR-1025 emulsifier |
| P1B | Copolymer latex of ODCEA (25 wt %) and VAc (75 wt %) made using AR-2025 emulsifier |
| P1C | Copolymer latex of ODCEA (25 wt %) and VAc (75 wt %) made using AR-3025 emulsifier |
| P1D | Copolymer latex of ODCEA (25 wt %) and VAc (75 wt %) made using MH-6106 emulsifier |
| P1E | Copolymer latex of ODCEA (25 wt %) and VAc (75 wt %) made using MH-6112 emulsifier |
| P1F | Copolymer latex of ODCEA (25 wt %) and VAc (75 wt %) made using BC-1025 emulsifier |
| P1G | Copolymer latex of ODCEA (25 wt %) and VAc (75 wt %) made using KH-1025 emulsifier |
| P1H | Copolymer latex of ODCEA (25 wt %) and VAc (75 wt %) made using FES 32 emulsifier |
| P1I | Copolymer latex of ODCEA (25 wt %) and VAc (75 wt %) made using DS-10 emulsifier |
| 3M 850 Tape | 3M ™ Polyester Film Tape 850 |
| 3M 845 Tape | Scotch ™ No. 845 Book Tape (PP film with synthetic clean adhesive) |
| 3M 232 Tape | 3M ™ High Performance Masking Tape 232 (paper backing with rubber adhesive) |
| 3M 3850 Tape | 3M ™ 3850 Scotch ™ Packaging Tape |
| 7419 | Modified Polyolefin with Maleic Acid Adhesion Promoter (25% active) obtained under the tradename "ADVABOND 7419" from Advanced Polymer Inc., Carlstadt, New Jersey |

Testing Tape 1 was prepared by hotmelt continuous coating at about 25 micron thick of a synthetic rubber based adhesive mixture comprising 100 parts of SIS block copolymer having a styrene content of 14.3%, a coupling efficiency of 88% and a melt index of 9 g/10 min (condition G) obtained under the trade designation QUINTAC 3620 from Zeon, Tokyo, Japan; 85 parts of C9 modified C5 tackifying resin having a Ring and Ball Softening point of 87° C. available from Cray Valley, Exton, PA as the trade designation "WINGTACK™ 86", and 2 parts of antioxidant onto a 50 micron thick of corona treated 1.3 mil (0.03 millimeters) biaxial oriented polypropylene film from 3M Co., Maplewood, MN The opposite side of the BOPP film was then coated with a solvent based comparative release coating and dried.

Test Methods

Preparation of Laminates for Release and Readhesion Testing. Four test tapes (3M 845, 850, 3750, and 232) were used to evaluate the release performance of prepared coatings on film backings. Coated strips of film (PET or PP, 1 in ×8 in) were adhered to a glass plate using double-sided tape such that the coated side (LAB) was facing up (out). A strip of test tape (1 in ×9 in) was then cut and laminated with its adhesive against the test LAB using a 2 kg. rubber roller rolled twice back and forth over the strips. The laminated tape stripes were aged at different conditions (as indicated in the tables) for 7 days unless otherwise indicated: (1) 23° C., 50% relative humidity (CTH); (2) 50° C.; and (3) 90° F. (32° C.), 90% RH. Once the samples are aged, the test tape was peeled from the LAB film using a peel tester (Model IMASS SP-2000 Slip/Peel Tester, available from IMASS, Incorporated, Accord, MA) at an angle of 180° and at a rate of 90 in/min with a data averaging time of 5 s. An average value for 3 peel tests is reported in the tables below.

After release testing, the tape was laminated onto a clean glass surface using a rubber mallet as above. The glass plates were cleaned by successively wiping them with hexanes, isopropanol, and methyl ethyl ketone using a KIMWIPE (Kimberly-Clark Corporation, Neenah, WI) wetted with the solvents. Once the tape was laminated onto the glass surface, a 5-lb roller was used back and forth once on the tape strip before measuring the readhesion force. Peel force data were collected in the same manner as above and an average of 3 measurements is reported as readhesion force in the tables below.

Percent solids of latex solutions were determined gravimetrically by standard methods. pH was measured using a hand-held meter. Particle size was determined by dynamic light scattering (Brookhaven NanoBrook 90Plus PALS, Holtsville, NY).

EXAMPLES

Synthesis of Octadecyl Carbamoyl Ethyl Acrylate (ODCEA)

1 equivalent of octadecyl isocyanate was charged into a 500 ml flask containing a solution comprising 1.01 equivalents of hydroxyethyl acrylate, a trace amount of dibutyltin dilaurate catalyst, and required amount of ethyl acetate to make a 30% solids solution. The reaction mixture was stirred and allowed to react overnight at 50° C. Upon cooling, the precipitate formed was isolated by filtration, recrystallized from ethyl acetate, and dried under vacuum at 40° C. for 48 hours to provide ODCEA monomer. The solid monomer was analyzed using NMR and IR to monitor the conversion and the purity of the ODCEA monomer.

General Synthesis of Acrylic Latex

In a clean reactor fitted with a mechanical stirrer, a thermocouple, and nitrogen inlet/outlet were added the monomers at the desired ratio (total 100 parts by weight), copolymerizable emulsifier (6 parts by weight with respect to the monomer), sodium bicarbonate (2.5 parts by weight with respect to the monomer), and water (amount determined by % solids) were charged. The reaction mixture was heated to 75° C. and then passed through a high-pressure homogenizer from Microfluidizer Inc. (obtained from Microfluidics, Westwood, Massachusetts) preheated at 75° C. for two rounds of passes. After homogenization, the reaction mixture was charged back to the reactor and sealed. The reaction mixture was purged with nitrogen and then charged with ammonium persulfate (2.5 parts by weight with respect to the monomer). The reaction mixture was maintained at 75° C. for 12 h, followed by being cooled to room temperature, filtered through a 5 µm filter, and examined for coagulum. The resulting latex was analyzed for % solids (gravimetrically), pH, and particle size by dynamic light scattering (Brookhaven NanoBrook 90Plus PALS). Latex solutions were diluted to 5%-30% solids with additional DI water before use.

Synthesis of Copolymer Latexes P1A and P2, and P3 were performed using the above procedure with the various free-radically polymerizable surfactants and comparative emulsifier identified in the forthcoming tables.

Preparation of coated and stretched PET Films. The following procedure is representative for a coated PET film. A 5% solids solution of P1A was coated onto 20 mil cast PET using a Mayer rod #12. The coating was dried in an oven at 80° C. for 2 min. Coated samples were cut to 5 in×5 in and stretched in KARO IV lab stretcher (Bruckner) by the following procedure: (i) pre-heat in a first oven at 100° C. for 45 s (ii) stretch at 40% continuous rate simultaneously in the cross-web and down-web directions to 3.1×3.1 (iii) move to the second oven set at 225° C. and stretch similarly to 3.2×3.2 (iv) anneal at 225° C. for 20 s. The final thickness of the PET film is ca. 2 mil and the calculated thickness of the stretched coated layer is ca. 130 nm.

Preparation of Coated and Stretched PP Films

A 10% (aq) coating solution that was prepared by successively mixing P1A (27% solids aq, 33.3 g), DI-water (63.0 g), DYNOL 607 (0.100 g), and ADVABOND 7419 (3.6 g) and stirring the mixture for 10 min. The solution was coated using a #6 or #12 Mayer rod onto cast polypropylene substrate (54 mil thick) and the film was dried at 75° C. for 2 min. The coated cast film was converted to sheets that were loaded into a KARO IV lab stretcher (Bruckner), stretched 5 in ×7 in at 152° C. The calculated coating thickness on the stretched films was 40 nm (Mayer rod #6) and 80 nm (Mayer rod #12).

Preparation Examples 1-S to 4-S

A cast PET film was coated with a solution of P1A and stretched as described above. Laminates were made with test tapes as described above. Release and readhesion data are listed in Table 2.

Preparation of Unstretched Examples 1-U to 4-U

A 2 mil finished primed PET film obtained from Mitsubishi film (3SAB) was coated with P1A and dried at 80° C. for 2 min. Laminates were made with test tapes as described above. Release and readhesion data is in Table 2.

TABLE 2

Release and readhesion results with varied test tapes

| | CTH (oz/in) | | 50° C. (oz/in) | | |
| --- | --- | --- | --- | --- | --- |
| Sample | Release | Readhesion | Release | Readhesion | Test Tape |
| EX 1-S | 5.9 | 49.3 | 6.3 | 53.1 | 3M 232 Tape |
| EX 1-U | 17.5 | 46.6 | 17.5 | 48.6 | 3M 232 Tape |
| EX 2-S | 4.9 | 38.0 | 4.7 | 32.3 | 3M 845 Tape |
| EX 2-U | 8.2 | 44.7 | 7.02 | 43.7 | 3M 845 Tape |
| EX 3-S | 2.4 | 38.0 | 2.5 | 33.5 | 3M 850 Tape |
| EX 3-U | 2.8 | 45.3 | 3.3 | 44.4 | 3M 850 Tape |
| EX 4-S | 1.8 | 55.8 | 1.8 | 54.3 | Test Tape 1 |
| EX 4-U | 2.3 | 58.5 | 2.2 | 59.4 | Test Tape 1 |

Preparation of Examples 5 to 12 and Comparative Examples 5 to 9

Samples was prepared in the same manner as described for Comparative Examples 1 to 4 using the latex polymers indicated in Table 3. Examples 5 to 12 were prepared using polymerizable emulsifiers. Comparative examples 5 to 9 were prepared using non-polymerizable emulsifiers.

TABLE 3

Release and readhesion results for polymer latexes prepared with varied emulsifiers, coated on unstretched primed PET, and tested with 3M 232 Tape

| Sample | Polymer Latex | CTH (oz/in) Release | CTH (oz/in) Readhesion | 50° C. (oz/in) Release | 50° C. (oz/in) Readhesion |
|---|---|---|---|---|---|
| EX 5 | P1A | 17.5 | 46.6 | 17.5 | 48.6 |
| EX 6 | P1B | 17.4 | 38.3 | 26.7 | 37.4 |
| EX 7 | P1C | 19.6 | 42.4 | 29.0 | 39.1 |
| EX 8 | P1D | 20.5 | 37.5 | 20.5 | 35.0 |
| EX 9 | P1E | 13.6 | 38.9 | 29.0 | 38.3 |
| EX 10 | P1F | 19.2 | 38.8 | 27.4 | 36.8 |
| EX 11 | P1G | 17.3 | 41.1 | 28.6 | 39.2 |
| CE 5 | P1H | 24.7 | 44.8 | 37.9 | 40.9 |
| CE 6 | PI | 33.0 | 39.4 | 40.4 | 39.4 |

TABLE 4

Release and Readhesion Results for polymer latexes prepared using ODCEA and ODA monomers, coated on primed unstretched PET, and tested with 3M 232 Tape.

| Sample | Polymer latex | CTH (oz/in) Release | CTH (oz/in) Readhesion | 50° C. (oz/in) Release | 50° C. (oz/in) Readhesion |
|---|---|---|---|---|---|
| EX 12 | P3 | 20.6 | 36.9 | 37.9 | 36.7 |

TABLE 5

Release and readhesion results for polymer latex on stretched PP with 3M 850 and 845 Tapes

| Sample | Polymer Latex | Aging Condition | 3M 850 Tape Release (oz/in) | 3M 850 Tape Readhesion (oz/in) | 3M 845 Tape Release (oz/in) | 3M 845 Tape Readhesion (oz/in) |
|---|---|---|---|---|---|---|
| EX 13 | P1A | CTH | 24.37 | 31.71 | 36.27 | 36.32 |
|  |  | 50° C. | 31.07 | 25.13 | 25.10 | 16.37 |

TABLE 6

Release and readhesion results for polymer latex on stretched PP with 3M 232 and 3850 Tapes

| Sample | Polymer Latex | Aging Condition | 3M 232 Tape Release (oz/in) | 3M 232 Tape Readhesion (oz/in) | 3M 3850 Tape Release (oz/in) | 3M 3850 Tape Readhesion (oz/in) |
|---|---|---|---|---|---|---|
| EX 14 | P1A | CTH | 32.87 | 33.46 | 49.85 | 43.81 |
|  |  | 50° C. | 37.57 | 32.06 | 42.15 | 24.72 |

TABLE 7

Testing Data for Latex Compositions on PET for Liner Applications with 3M™ Adhesive Transfer Tape 467MP (acrylic adhesive)

| Polymer Latex | CTH Release (g/in) | CTH Readhesion to Steel (oz/in) | 90%/90° F. Release (g/in) | 90%/90° F. Readhesion to Steel (oz/in) | 70° C. Release (g/in) | 70° C. Readhesion to Steel (oz/in) |
|---|---|---|---|---|---|---|
| P2 (Stretched) | 13.4 | 44.8 | 19.1 | 42.4 | 23.1 | 43.1 |
| P2 (Unstretched) | 15.7 | 46.0 | 29.4 | 47.3 | 24.1 | 40.3 |

What is claimed is:

1. A release composition comprising a waterborne latex polymer particles comprising a polymerization reaction product of:
    i) a first monomer having the formula $$C_nH_{2n+1}-Y-C_mH_{2m}-X-CR^1=CH_2$$

wherein n ranges from 12 to 24;
    Y is a nitrogen-containing or ester linking group;
    $R^1$ is hydrogen or methyl;
    m ranges from 2 to 10; and
    X is a divalent linking group selected from ester or amide;
    ii) a second free-radically polymerizable monomer having less than 12 carbon atoms;
    iii) a free-radically polymerizable surfactant; and
    an aqueous carrier liquid.

2. The release composition of claim 1 wherein the first monomer has an alkyl group with at least 16, 17, or 18 carbon atoms.

3. The release composition of claim 1 wherein the first monomer comprises a urethane linking group.

4. The release composition of claim 1 wherein the waterborne latex polymer particles comprise 1 to 15 wt. % of polymerized units of the free-radically polymerizable surfactant based on the total amount of i), ii) and iii).

5. The release composition of claim 1 wherein the second monomer comprises an alkyl or alkylene group having 2 to 4 carbon atoms.

6. The release composition of claim 1 wherein the polymerizable surfactant comprises an anionic group.

7. The release composition of claim 6 wherein the anionic group is a sulfur-containing or phosphorous-containing anion.

8. The release composition of claim 1 wherein the polymerizable surfactant comprises ethylene oxide repeat units.

9. A release composition comprising a waterborne latex polymer particles comprising a polymerization reaction product of:
    i) a first monomer having an alkyl group with 12 to 24 carbon atoms, a nitrogen-containing or ester linking group, and a free-radically polymerizable (meth)acryl group;
    ii) a second free-radically polymerizable monomer having less than 12 carbon atoms;
    iii) a free-radically polymerizable surfactant; and
    an aqueous carrier liquid;
    wherein the release composition comprises less than 100 ppm of unpolymerized surfactant based on the solid weight of the latex polymer.

10. The release composition of claim 9 wherein the free-radically polymerizable (meth)acryl group is (meth)acrylate or (meth)acrylamide.

11. A method of making a release coated article comprising:
    providing a substrate;
    coating the release composition of claim 1 onto the substrate; and
    removing the aqueous carrier liquid.

12. The method of claim 11 wherein the substrate is film.

13. The method of claim 12 wherein the film comprises a thermoplastic material.

14. The method of claim 12 further comprising stretching the release coated film.

15. An article comprising a substrate and a release coating comprising
  i) polymerized units of a first monomer having the formula

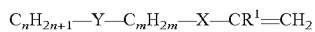
  $C_nH_{2n+1}-Y-C_mH_{2m}-X-CR^1=CH_2$ wherein n ranges from 12 to 24;
  Y is a nitrogen-containing or ester linking group;
  $R^1$ is hydrogen or methyl;
  m ranges from 2 to 10; and
  X is a divalent linking group selected from ester or amide;
  ii) polymerized units of a second monomer having less than 12 carbon atoms;
  iii) polymerized units of a surfactant.

16. The article of claim 15 wherein the article comprises a uniaxially or biaxially oriented film.

17. The article of claim 15 further comprising a pressure sensitive adhesive in contact with the release coating.

18. The article of claim 17 wherein the article is a tape.

* * * * *